United States Patent
Mei et al.

(10) Patent No.: US 7,723,260 B2
(45) Date of Patent: May 25, 2010

(54) METHANOL OXIDATION CATALYST

(75) Inventors: Wu Mei, Yokohama (JP); Taishi Fukazawa, Fuchu (JP); Itsuko Mizutani, Yokohama (JP); Tsuyoshi Kobayashi, Kawasaki (JP); Yoshihiko Nakano, Yokohama (JP); Mina Farag, Fremont, CA (US); Yi-Qun Li, Fremont, CA (US); Shinji Aoki, Fremont, CA (US)

(73) Assignees: Kabushiki Kaisha Toshiba, Tokyo (JP); Intematix Corporation, Fremont, CA (US)

( * ) Notice: Subject to any disclaimer, the term of this patent is extended or adjusted under 35 U.S.C. 154(b) by 120 days.

(21) Appl. No.: 11/863,798

(22) Filed: Sep. 28, 2007

(65) Prior Publication Data

US 2009/0082198 A1 Mar. 26, 2009

(30) Foreign Application Priority Data

Sep. 21, 2007 (JP) ............... 2007-244854

(51) Int. Cl.
B01J 23/00 (2006.01)
C23C 14/00 (2006.01)

(52) U.S. Cl. .................. 502/310; 502/313; 502/220; 502/211; 204/192.15

(58) Field of Classification Search .......... 502/305, 502/308–313, 321, 325, 326, 337, 339, 349, 502/352, 353
See application file for complete search history.

(56) References Cited

U.S. PATENT DOCUMENTS 3,506,494 A 4/1970 Adlhart

2004/0072061 A1* 4/2004 Nakano et al. .............. 429/44
2005/0048205 A1* 3/2005 Woo et al. ................ 427/248.1
2007/0087258 A1 4/2007 Mei et al.
2007/0254806 A1 11/2007 Mei et al.

FOREIGN PATENT DOCUMENTS

JP 2004-281177 10/2004
JP 2006-179445 7/2006

OTHER PUBLICATIONS

U.S. Appl. No. 12/049,770, filed Mar. 17, 2008, Yamamoto, et al.
U.S. Appl. No. 12/121,282, filed May 15, 2008, Fukazawa, et al.
U.S. Appl. No. 12/201,332, filed Aug. 29, 2008, Tamura, et al.
U.S. App. No. 11/863,856, filed Sep. 28, 2007, Mei, et al.
U.S. Appl. No. 12/401,255, filed Mar. 10, 2009, Mei, et al.

* cited by examiner

Primary Examiner—Timothy C Vanoy
Assistant Examiner—Richard M Rump
(74) Attorney, Agent, or Firm—Oblon, Spivak, McClelland, Maier & Neustadt, L.L.P.

(57) ABSTRACT

A methanol oxidation catalyst is provided, which includes nanoparticles having a composition represented by the following formula (1):

$$Pt_xRu_yMo_zT_u \quad (1)$$

In the formula (1), the T-element is at least one selected from the group consisting of W and V, x is 20 to 80 at. %, y is 10 to 60 at. %, z is 1 to 30 at. % and u is 1 to 30 at. %. The area of the peak derived from oxygen bond of T-element is 80% or less of the area of the peak derived from metal bond of T-element in a spectrum measured by an X-ray photoelectron spectral method.

22 Claims, 4 Drawing Sheets

20nm

METHANOL OXIDATION CATALYST

CROSS-REFERENCE TO RELATED APPLICATIONS

This application is based upon and claims the benefit of priority from prior Japanese Patent Application No. 2007-244854, filed Sep. 21, 2007, the entire contents of which are incorporated herein by reference.

BACKGROUND OF THE INVENTION

1. Field of the Invention

The present invention relates to a methanol oxidation catalyst and a method for producing the methanol oxidation catalyst.

2. Description of the Related Art

Solid polymer type fuel cells, and particularly solid polymer type fuel cells using an aqueous methanol solution as fuel can work at low temperatures and can be small-sized and reduced in weight. Such a fuel cell converts chemical energy into electric power by the catalytic reaction of an electrode. Therefore, a highly active catalyst is essential to develop a high-performance fuel cell.

PtRu is usually used as the anode catalyst of a fuel cell. The theoretical voltage obtained by the catalytic reaction of the electrode is 1.21V, whereas the voltage loss due to the PtRu catalyst is about 0.3V. Various techniques for improving methanol oxidation activity have been reported.

For example, a method in which metals such as tungsten, tantalum and niobium are added is described in U.S. Pat. No. 3,506,494. The reaction field of a catalytic reaction exists on the surface of catalyst particles having a nano-size and therefore, a few atomic layers on the surface of the catalyst have a large influence on the activity of the catalyst. For this reason, there is the possibility that the state of the surface of the catalyst is changed depending on the synthetic process even in the case where the composition of the catalyst is the same. There is also the possibility that a highly active catalyst over PtRu will be found by controlling the synthetic process to synthesize catalyst particles having a nano-structure that has not been developed so far. A solution method such as a dipping method has been usually adopted to synthesize catalysts.

The solution method involves some difficulties in controlling the structure and surface state of the catalyst, and such a tendency is significant in the case of elements which are resistant to reduction and are hardly alloyed. Because the catalyst is nano-particles, the state of electrons on the surface of the catalyst and the nano-structure of the particles are strongly dependent on the type and amount of the elements to be added. In order to obtain high activity and high stability, it is necessary to appropriately adopt the type and amount of the elements to be added and a combination of these elements.

In U.S. Pat. No. 6,171,721, and Jpn. Pat. Appln. KOKAI Publication Nos. 2004-281177 and 2006-179445, there are descriptions concerning a sputtering process. Besides Pt and Ru, many elements are listed and ternary systems such as Pt—Ru—W and Pt—Ru—Mo are also reported. However, only insufficient studies have bee made as to catalyst compositions, and no catalyst having satisfactory methanol oxidation activity and stability has been established yet.

BRIEF SUMMARY OF THE INVENTION

A methanol oxidation catalyst according to one aspect of the present invention comprises: nanoparticles having a composition represented by following formula 1:

$$Pt_xRu_yMo_zT_u \tag{1}$$

where the T-element is at least one selected from the group consisting of W and V, x is 20 to 80 at. %, y is 10 to 60 at. %, z is 1 to 30 at. % and u is 1 to 30 at. %, wherein the area of the peak derived from oxygen bond of T-element is 80% or less of the area of the peak derived from metal bond of T-element in a spectrum measured by an X-ray photoelectron spectral method.

A method for manufacturing the methanol oxidation catalyst according to one aspect of the present invention comprises:

keeping a conductive support at 400° C. or less; and depositing structural metal elements to the conductive support by a sputtering method or vapor deposition method to form the nanoparticles.

DETAILED DESCRIPTION OF THE INVENTION

Figure 1:
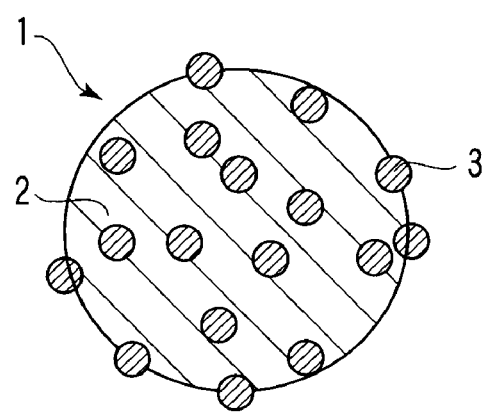
FIG. 1 is a typical view of a methanol oxidation catalyst according to one embodiment.

The inventors have made earnest studies as to the relation between a process of synthesizing a catalyst and the composition of the catalyst and, as a result, obtained the following teaching. In nanoparticles having the composition represented by the following formula (1), Mo and a T-element are introduced as co-catalyst to bind with a major catalyst element constituted of Pt and Ru through a metal bond to obtain a highly active catalyst. Such a metal bond can be formed by making a PtRu alloy contain Mo and a T-element on a conductive support kept at 400° C. by a sputtering method or vapor deposition method.

$$Pt_xRu_yMo_zT_u \tag{1}$$

The T-element is at least one selected from the group consisting of W and V, x is 20 to 80 at. %, y is 10 to 60 at. %, z is 1 to 30 at. % and u is 1 to 30 at. %.

Pt and Ru are major catalyst elements. Pt is very effective for the oxidation of hydrogen and dehydrogenation reaction of organic fuel, and Ru is very effective for a restriction on CO poisoning. When the amount of Ru is small, unsatisfactory catalyst activity is obtained. Therefore, x is limited to 20 to 80 at. % and y is limited to 10 to 60 at. %. When a part of Pt or Ru is substituted with other metals, the activity of the catalyst can be more improved. As these metals, noble metals such as Rh, Os, Ir, Pd, Ag and Au are preferable because these metals are particularly superior in chemical stability.

Mo and the T-element are co-catalysts. The T-element is at least one selected from W and V. The catalyst prepared by adding the T-element and Mo to Pt and Ru according to the embodiment exhibits high activity. This is considered to be because the surface structure and electronic state of the catalyst originated from a specified mixing state of each element are major causes to improve the activity of the catalyst. It is thought that the presence of a metal bond between Mo/T-element and Pt/Ru particularly contributes to an improvement in activity.

When catalyst particles are synthesized by, for example, a solution method, a reaction reducing W, V, Mo or the like is scarcely caused and therefore, it becomes difficult to promote the formation of an alloy of such an element and the major catalyst elements (Pt, Ru). Accordingly, a large part of the obtained catalyst particles are a mixture of PtRu nanoparticles and oxide nanoparticles of the T-element. The catalyst particles synthesized by a solution method were surface-analyzed by a X-ray photoelectron spectral method (XPS), to find that almost all bonds of Mo and T-element were oxygen bonds.

In the methanol oxidation catalyst according to the embodiment, for Mo and the T-element, besides the peak derived from their metal bond, the peak from their oxygen bond is usually observed in a XPS spectrum. To obtain high activity, it is important that the peak area of oxygen bond of T element is 80% or less of that of metal bond of T element in a XPS spectrum.

It is to be noted that though various studies have been made as to the use of oxides of Mo and a T-element as a support of a catalyst, only insufficient improvement in the characteristics of the catalyst has been made. In the embodiment, the T-element and Mo are added as co-catalyst elements to the catalyst nanoparticles by a sputtering method or vapor deposition method. This resultantly has made it possible to obtain a catalyst having high activity.

The content z of the Mo element is limited to 1 to 30 at. %. When the content z is less than 1 at. %, the cocatalyst action of the Mo element is low. On the other hand, when the Mo element is contained in a large amount exceeding 30 at. %, the number of major active sites constituted of the major catalyst elements is relatively reduced, leading to reduced catalyst activity. The content z of the Mo element is more preferably 2 to 20 at. %.

With regard to the T-element, its content u is limited to 1 to 30 at. % from the same reason as in the case of Mo. The content u of the T-element is more preferably 2 to 20 at. %.

Besides the structural metal elements as mentioned above, oxygen may be contained in the methanol oxidation catalyst according to the embodiment. If the oxygen content is 25 at. % or less, the catalyst activity is not significantly dropped. The content of impurity elements such as P, S and Cl is 0.1 at. % or less. There is the possibility that these impurity elements intermingle during the production and treating process of the catalyst or membrane electrode assembly. However, if the content of these impurities is 0.1 at. % or less, a deterioration in characteristics is small.

The catalyst particles according to the embodiment are preferably nanoparticles. In this case, the highest activity is obtained. The average particle diameter of the nanoparticles is preferably 10 nm or less. If the particle diameter of the catalyst particles exceeds 10 nm, there is a fear that the efficiency of catalyst activity is significantly decreased. The average particle diameter is more preferably in the range of 0.5 to 10 nm. When the average particle diameter is less than 0.5 nm, it is difficult to control the catalyst synthesizing process, bringing about an increase in the cost of catalyst synthesis. As the catalyst particles, nanoparticles having an average particle diameter of 10 nm or less may be singly used. However, an aggregate (secondary particles) of primary particles constituted of these nanoparticles may also be used. Also, these nanoparticles may be supported by a conductive support.

Figure 2:
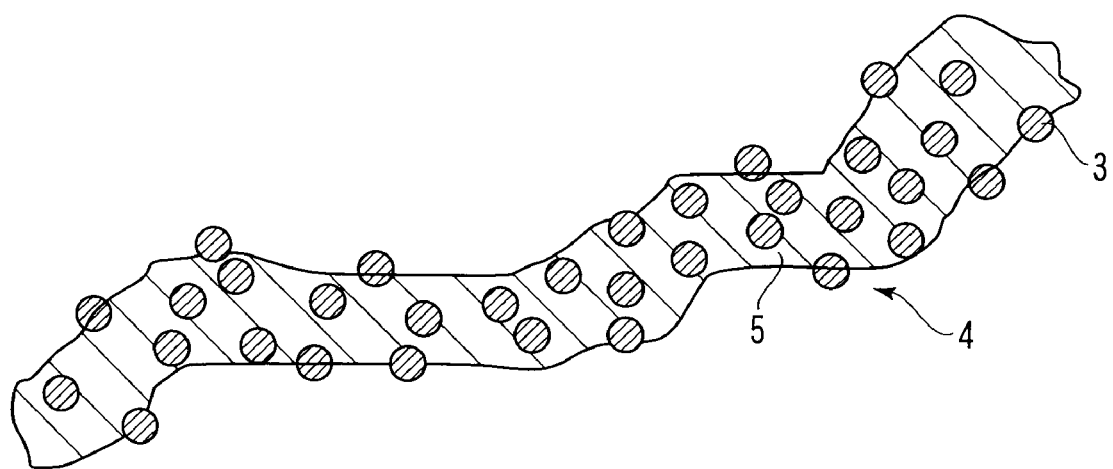
FIG. 2 is a typical view of a methanol oxidation catalyst according to another embodiment.
Figure 3:
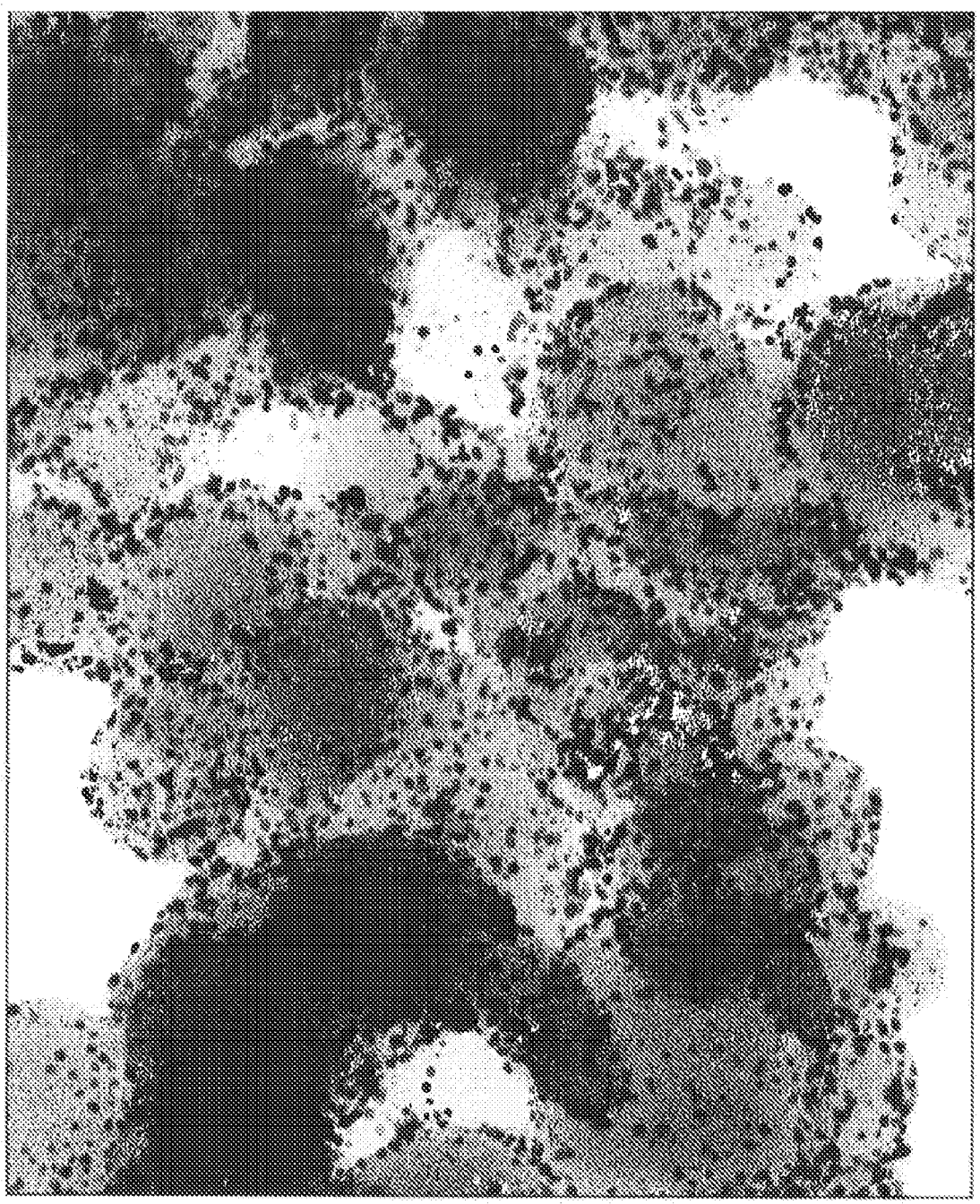
FIG. 3 is a TEM photograph of a catalyst layer constituted by a methanol oxidation catalyst according to one embodiment.

As shown in FIG. 1, a carbon-supported catalyst 1 may be constituted by allowing carbon particles 2 as the conductive support to support catalyst particles 3. Alternatively, as shown in FIG. 2, a carbon-supported catalyst 4 may be constituted by alloying a carbon nano-fiber 5 as the conductive support to support the catalyst particles 3. FIG. 3 shows a TEM photograph of a catalyst layer constituted of catalyst particles supported by carbon particles. Examples of the conductive support may include carbon black. However, the conductive support is not limited to carbon black but any desired support superior in conductivity and stability may be used.

As the conductive support, nanocarbon materials, for example, fiber-form, tube-form or coil-form materials have been developed. These supports are different in surface state. The catalyst particles according to the embodiment are more improved in activity when supported by these nanocarbon materials. Besides these carbon materials, conductive ceramics materials may be used as the support. In this case, a more synergetic effect of the ceramics support and the catalyst particles can be expected.

The methanol oxidation catalyst according to the embodiment may be manufactured by a sputtering method or a vapor deposition method. The inventors have found that these methods can more easily produce a catalyst having a metal bond than solution methods such as an impregnation method, precipitation method or colloidal method. The solution methods not only entail high costs but also have difficulties in obtaining a desired bond state. In a sputtering method or vapor deposition method, an alloy target may be used. Alternatively, each metal target of the structural elements may be used to carry out simultaneous sputtering or simultaneous vapor deposition.

When a sputtering method is adopted, first, a particulate or fibrous conductive support is sufficiently dispersed. Next, the dispersed support is received in a holder disposed in a chamber of a sputtering apparatus and is then treated by sputtering with stirring to allow the structural metals of the catalyst to adhere to the dispersed support. The catalyst can be made to adhere uniformly to the support by this stirring. The temperature of the support during sputtering is preferably 400° C. or less. When the temperature exceeds 400° C., there is the case where phase separation of the catalyst particles is caused, bringing about non-stabilized catalyst activity. In order to cut the cost required to cool the support, the lower limit of the temperature of the support is desired to be 10° C. The temperature of the support may be measured by a thermocouple.

As the conductive support sputtered with the catalyst particles, porous paper containing conductive carbon fibers, an electrode diffusion layer or an electrolytic membrane may also be used. In this case, it is necessary to form the catalyst in the state of nanoparticles by regulating the process. For the same reason as above, the temperature of the porous paper is desirably 400° C. or less.

After the catalyst particles are formed by a sputtering method or vapor deposition method, acid washing treatment, alkali treatment or heat treatment is carried out, whereby the activity of the catalyst can be more improved. It is considered that the structure or surface structure of the catalyst can be made into more appropriate state by such treatment.

In the acid washing treatment, an aqueous acid solution may be used and an aqueous sulfuric acid solution is exemplified as the aqueous acid solution. In the alkali treatment, an aqueous alkali solution may be used. The structure or surface structure of the catalyst may be made into a more appropriate state by the heat treatment. With regard to the after-heat treatment, the catalyst particles are preferably treated at 10 to 40° C. or less in an atmosphere where the partial pressure of oxygen is less than 5%.

Because the formation of the nanoparticles is promoted, other materials such as carbon may be deposited to the conductive support together with the structural metal elements. Moreover, metals having high solubility, for example, Cu, Zn or Ni and the structural metal elements may be sputtered or deposited simultaneously and then, Cu, Zn, Ni or the like can be removed by, for example, acid washing treatment.

Figure 4:
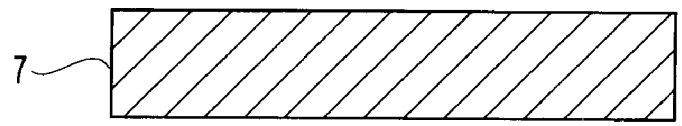
FIG. 4 is a sectional view showing a process of producing a laminate type electrode.
Figure 5:
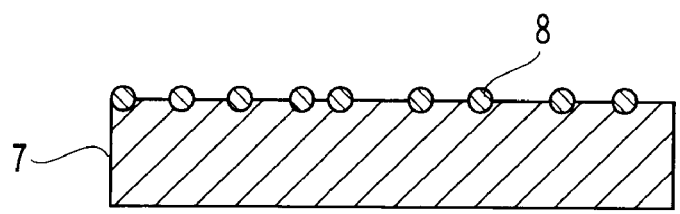
FIG. 5 is a sectional view showing a process subsequent to the process shown in FIG. 4.
Figure 6:
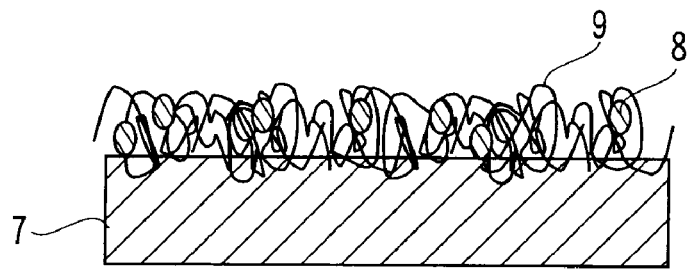
FIG. 6 is a sectional view showing a process subsequent to the process shown in FIG. 5.

A method for producing a laminate type electrode by using a methanol catalyst according to the embodiment will be explained with reference to FIGS. 4 to 11. First, as shown in FIG. 4, a carbon paper 7 is prepared and as shown in FIG. 5, Ni particles 8 are deposited to the surface of the carbon paper 7 by a sputtering method. Next, a carbon nano-fiber (CNF) layer 9 is, as shown in FIG. 6, synthesized in the condition such as $C_2H_4/H_2$, and 400-700° C.

Figure 7:
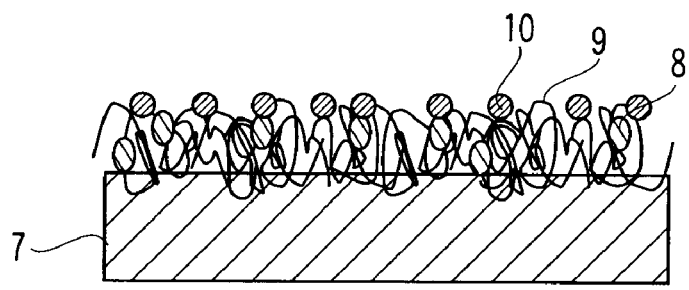
FIG. 7 is a sectional view showing a process subsequent to the process shown in FIG. 6.
Figure 8:
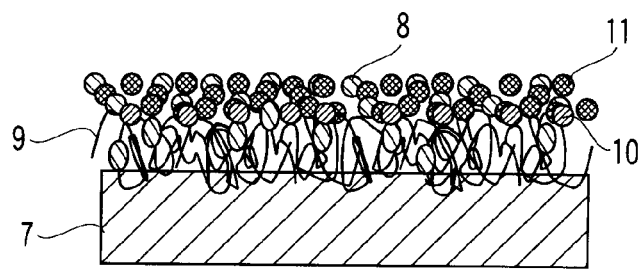
FIG. 8 is a sectional view showing a process subsequent to the process shown in FIG. 7.
Figure 9:
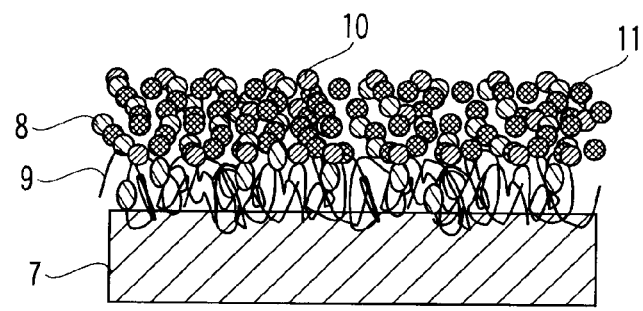
FIG. 9 is a sectional view showing a process subsequent to the process shown in FIG. 8.

The CNF layer 9 is made to carry RtRu particles 10 as shown in FIG. 7 by a sputtering method and then, carbon and nickel are sputtered simultaneously to make the CNF layer 9 carry carbon particles 11 and Ni particles 8 as shown in FIG. 8. This process is repeated to further laminate the RtRu particles 10, carbon particles 11 and Ni particles 8 as shown in FIG. 9.

Figure 10:
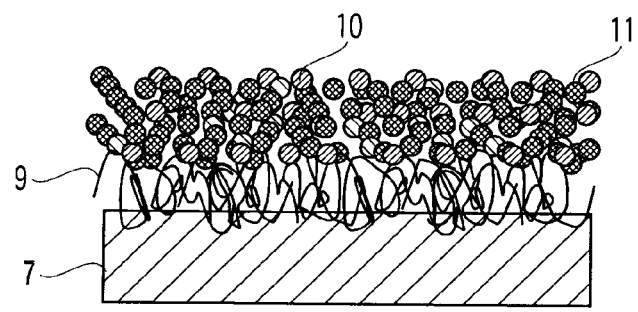
FIG. 10 is a sectional view showing a process subsequent to the process shown in FIG. 9.
Figure 11:
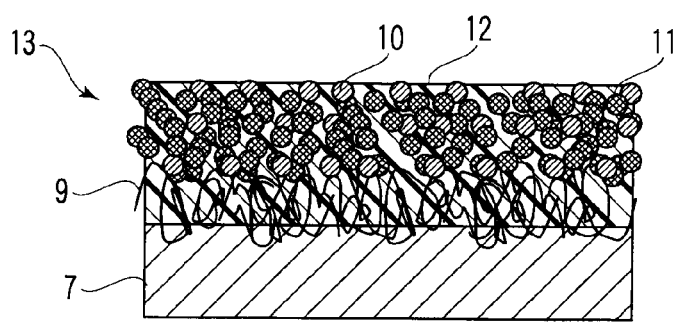
FIG. 11 is a sectional view showing a process subsequent to the process shown in FIG. 10.

The Ni particles 8 are removed by treating with $H_2SO_4$ as shown in FIG. 10, followed by impregnating with Nafion 12 under reduced pressure. A laminate type electrode 13 is obtained by the above steps.

The methanol oxidation catalyst according to the embodiment may be used as an anode electrode of a membrane electrode assembly (MEA). A proton conductive membrane is supported by and interposed between an anode electrode and a cathode electrode to constitute the MEA.

Any material may be used as the proton conductive material contained in the proton conductive membrane or the like without any particular limitation as long as it can transmit protons. Examples of the proton conductive material include fluororesins having a sulfonic acid group such as Nafion (manufactured by Du Pont), Flemion (manufactured by Asahi Kasei Corporation) and Aciplex (manufactured by Asahi Chemical Glass Co., Ltd.) and inorganic materials such as tungstic acid and phosphotungstic acid.

A fuel cell can be manufactured by combining the MEA as mentioned above, means for supplying fuel to an anode electrode and means for supplying an oxidant to a cathode electrode. The number of MEAs used may be one or two or more. If plural MEAs are used, a higher electromotive force can be obtained.

Examples of the present invention will be explained. However, the present invention is not limited to these examples.

EXAMPLES 1 TO 10 AND COMPARATIVE EXAMPLES 1 TO 10

First, a carbon black support (trade name: Vulcan XC72, manufactured by Cabot Corporation, specific surface area: about 230 $m^2/g$) was dispersed sufficiently and received in a holder. This holder was disposed in a chamber of an ion beam sputtering apparatus and then the chamber was evacuated. After the vacuum degree in the chamber reached $3\times10^{-6}$ Torr, Ar gas was introduced into the chamber.

Catalyst particles were deposited to a support by carrying out sputtering using a predetermined target such that the catalyst particles had each composition shown in Table 2. As the target, any of a metal target or an alloy target may be used.

The support to which the catalyst particles were deposited was subjected to acid washing treatment using an aqueous acid solution. The aqueous acid solution used here was prepared by adding 10 g of sulfuric acid to 200 g of water. Further, after the support was washed with water, it was dried to obtain a methanol oxidation catalyst.

COMPARATIVE EXAMPLE 11

First, 1000 mL of an ethanol solution containing tungsten hexachloride and molybdenum chloride was prepared. The amounts of a tungsten metal and a molybdenum metal in the solution were 112 mg and 6 mg, respectively. 500 mg of carbon black (trade name: Vulcan XC72, manufactured by Cabot Corporation, specific surface area: about 230 $m^2/g$) was added to the obtained solution, which was sufficiently stirred to disperse the carbon black uniformly. Thereafter, the solution was heated to 55° C. with stirring to volatilize ethanol.

The residue was heated at 300° C. for 3 hours with hydrogen gas flowing at a flow rate of 50 mL/minutes to carry tungsten on the carbon black. On the other hand, 300 mL (amount of a platinum metal: 309 mg) of a cyclohexane solution containing 1,5-cyclooctadienedimethyl platinum and 40 mL of an ethanol solution (ruthenium metal content: 54 mg) containing ruthenium chloride were mixed to prepare a solution. The foregoing carbon carrying tungsten was added in this solution, which was sufficiently stirred to disperse the carbon uniformly. After that, the dispersion solution was heated to 55° C. with stirring to volatilize a solvent.

Moreover, the residue obtained above was heated at 300° C. for 3 hours with hydrogen gas flowing at a flow rate of 50 mL/min. As a result, platinum, ruthenium, Mo and tungsten were carried on carbon black to obtain a methanol oxidation catalyst of Comparative Example 11.

COMPARATIVE EXAMPLE 12

A catalyst of Comparative Example 12 was produced in the same procedures as in Comparative Example 11 except that tungsten hexachloride was changed to vanadium chloride and the vanadium metal was used in an amount of 31 mg.

Each catalyst was subjected to the measurement of XPS using Quantum-2000 manufactured by PHI. A neutralization gun (electron gun and argon gun) was used to make charge-up compensation and charge correction (C1s: C—C=284.6 eV). The peak of each element derived from a metal bond and the peak of each element derived from an oxygen bond were identified. The results are shown in Table 1.

With regard to, for example, the V element measured using a V2p spectrum, a peak found in a bond energy range of 512 to 514 eV was identified as one derived from a metal bond and a peak found in a bond energy range of 516 to 518 eV was identified as one derived from an oxygen bond. With regard to the W element measured using a W4f spectrum, a peak found in a bond energy range of 31 to 34 eV was identified as one derived from a metal bond and a peak found in a bond energy range of 36 to 40 eV was identified as one derived from an oxygen bond.

TABLE 1

| Element | Range where peak exists (eV) | |
|---|---|---|
| | Metal bond | Oxygen bond |
| V | 512-513 (2p3/2) | 516-517 (2p3/2) |
| W | 31-34 (4f7/2) | 36-40 (4f5/2) |
| Mo | 227-228 (3d5/2) | 235-237 (3d5/2) |

When plural T-elements are contained in the catalyst particles, a T-element having the highest content is defined as a major T-element. A major T-element of each catalyst was measured and the results are shown in the following Table 2. The ratio of the peak areas of a major T-element was defined as the peak area derived from the oxygen bond of the element when the peak area derived from the metal bond of the element was 100%.

TABLE 2

| | Catalyst composition | Ratio of peak areas* (%) | |
|---|---|---|---|
| | | Mo element | Major T-element |
| Example 1 | $Pt_{50}Ru_{30}Mo_{10}W_{10}$ | 30 | Almost 0 |
| Example 2 | $Pt_{30}Ru_{40}Mo_{15}W_{15}$ | 40 | 10 |
| Example 3 | $Pt_{55}Ru_{10}Mo_5W_{30}$ | 60 | 30 |
| Example 4 | $Pt_{55}Ru_{41}Mo_2W_2$ | Almost 0 | Almost 0 |
| Example 5 | $Pt_{25}Ru_{15}Mo_{30}W_{30}$ | 50 | 40 |
| Example 6 | $Pt_{50}Ru_{30}Mo_{10}V_{10}$ | 30 | 50 |
| Example 7 | $Pt_{30}Ru_{40}Mo_{15}V_{15}$ | 40 | 30 |
| Example 8 | $Pt_{55}Ru_{10}Mo_5V_{30}$ | 50 | 40 |
| Example 9 | $Pt_{55}Ru_{41}Mo_2V_2$ | 60 | 50 |
| Example 10 | $Pt_{25}Ru_{15}Mo_{30}V_{30}$ | 40 | 60 |
| Comparative Example 1 | $Pt_{50}Ru_{50}$ | — | — |
| Comparative Example 2 | $Pt_{50}Ru_{48}W_2$ | — | 80 |
| Comparative Example 3 | $Pt_{50}Ru_{45}V_5$ | — | 60 |
| Comparative Example 4 | $Pt_{50}Ru_{48}Mo_2$ | 60 | — |
| Comparative Example 5 | $Pt_{90}Ru_9Mo_{0.5}W_{0.5}$ | 60 | 50 |
| Comparative Example 6 | $Pt_{10}Ru_{20}Mo_{35}W_{35}$ | 60 | 60 |
| Comparative Example 7 | $Pt_{25}Ru_{65}Mo_5W_5$ | 60 | 60 |
| Comparative Example 8 | $Pt_{90}Ru_9Mo_{0.5}V_{0.5}$ | 60 | 50 |
| Comparative Example 9 | $Pt_{10}Ru_{20}Mo_{35}V_{35}$ | 60 | 60 |
| Comparative Example 10 | $Pt_{25}Ru_{65}Mo_5V_5$ | 60 | 60 |
| Comparative Example 11 | $Pt_{50}Ru_{30}Mo_{10}W_{10}$ Solution method | No metal bond | No metal bond |
| Comparative Example 12 | $Pt_{50}Ru_{30}Mo_{10}V_{10}$ Solution method | No metal bond | No metal bond |

*Ratio of the peak derived from the oxygen bond of Mo or T-element to the peak derived from the metal bond of Mo or T-element.

In all the catalysts of Examples, as shown in Table 2, the area of the peak derived from an oxygen bond of each major T-element is 80% or less of that derived from a metal bond of the element in the XPS spectrum. In Comparative Example 11 produced by a solution method, on the other hand, almost all the bonds of the Mo element and W element were in an oxidized state. Also, in Comparative Example 12 produced in the same manner by a solution method, almost all the bonds of the Mo element and W element were in an oxidized state.

The samples measured above are catalysts which have been washed with an acid. There is the case where the peak of an oxide bond of a catalyst is higher before the acid washing than after the acid washing. This is mainly caused by the presence of an unstable oxide layer. In the case of a catalyst which has not been subjected to acid washing, the unstable catalyst layer changed during power generation and usually, the area ratio of the peak derived from an oxide bond is at the same level as in the case of a catalyst which has been subjected to acid washing.

Next, each catalyst obtained in Examples and Comparative Examples was used as an anode catalyst to constitute MEA, which was then used to manufacture a fuel cell, which was then evaluated.

In the production of an anode electrode, first 3 g of each catalyst, 8 g of pure water, 15 g of a 20% Nafion solution and 30 g of 2-ethoxyethanol were stirred sufficiently to disperse and then made into a slurry. The obtained slurry was applied to a carbon paper (350 µm, manufactured by Toray Industries Inc.) which had been subjected to water-repellent treatment by a control coater and dried. Thus, an anode electrode in which the loading density of a noble metal catalyst was 1 mg/cm$^2$ was manufactured.

On the other hand, in the production of a cathode electrode, a Pt catalyst was used. 2 g of the Pt catalyst (manufactured by Tanaka Kikinzoku), 5 g of pure water, 5 g of a 20% Nafion solution and 20 g of 2-ethoxyethanol were stirred sufficiently to disperse and then made into a slurry. The obtained slurry was applied to a carbon paper (350 µm, manufactured by Toray Industries, Inc.) which had been subjected to water-repellent treatment by a control coater and dried. Thus, a cathode electrode in which the loading density of a noble metal catalyst was 2 mg/cm$^2$ was manufactured.

The cathode electrode and the anode electrode were respectively cut into a 3.2×3.2 cm square such that the area of the electrode was 10 cm$^2$. Nafion 17 (manufactured by Du Pont) to be used as a proton conductive solid polymer membrane was sandwiched between the cathode electrode and the anode electrode, followed by pressing under heating to manufacture a membrane electrode assembly. The condition of the pressing under heating was designed to be as follows: 125° C., 10 minutes and 30 kg/cm$^2$.

The obtained membrane electrode assembly and a flow path plate were used to manufacture a unit cell of a fuel direct supply type polymer electrolyte fuel cell. An aqueous 1M methanol solution as fuel was supplied to the anode electrode at a flow rate of 0.6 mL/min and at the same time, air as an oxidant was supplied to the cathode electrode at a flow rate of 200 mL/min. The cell was allowed to discharge under a current density of 150 mA/cm$^2$ while the cell was kept at 65° C. to measure the voltage of the cell after 30 minutes. Also, the unit cell was allowed to generate power in the same condition for 500 hours to examine the rate of a reduction in voltage under a current density of 150 mA/cm$^2$. The obtained results are shown as the deteriorated rate together with the voltage in Table 3.

TABLE 3

| | Voltage (V) | Rate of deterioration (%) |
|---|---|---|
| Example 1 | 0.49 | 10 |
| Example 2 | 0.48 | 11 |
| Example 3 | 0.49 | 12 |
| Example 4 | 0.50 | 10 |
| Example 5 | 0.51 | 13 |
| Example 6 | 0.48 | 12 |
| Example 7 | 0.50 | 12 |
| Example 8 | 0.48 | 13 |
| Example 9 | 0.47 | 12 |
| Example 10 | 0.47 | 13 |
| Comparative Example 1 | 0.42 | 10 |

TABLE 3-continued

| | Voltage (V) | Rate of deterioration (%) |
|---|---|---|
| Comparative Example 2 | 0.50 | 23 |
| Comparative Example 3 | 0.48 | 20 |
| Comparative Example 4 | 0.45 | 18 |
| Comparative Example 5 | 0.34 | 11 |
| Comparative Example 6 | 0.30 | 18 |
| Comparative Example 7 | 0.35 | 10 |
| Comparative Example 8 | 0.33 | 11 |
| Comparative Example 9 | 0.30 | 19 |
| Comparative Example 10 | 0.35 | 10 |
| Comparative Example 11 | 0.36 | 7 |
| Comparative Example 12 | 0.35 | 9 |

It is found from a comparison between Comparative Example 1 using only Pt and Ru and Examples 1 to 10 that the catalysts obtained in Examples 1 to 10 are increased in activity while maintaining stability at the same level. It is found from a comparison between Examples 1 to 5 and Comparative Examples 5 to 7 that the catalyst to which a combination of the Mo element and the W element is added not only has high activity but also has the same rate of deterioration as PtRu. It is found from a comparison between Examples 6 to 10 and Comparative Examples 8 to 10 that the catalyst to which a combination of the Mo element and the V element is added not only has high activity but also has a rate of deterioration equal to that of PtRu.

When the content of the Mo-element is less than 1 at. %, or exceeds 30 at. %, high activity and high stability cannot also be attained at the same time. When the content of the T-element is less than 1 at. %, or exceeds 30 at. %, high activity and high stability cannot also be attained at the same time. This is also clarified from a comparison between Examples 1 to 10 and Comparative Examples 2 to 10.

It has been confirmed from a comparison between Examples 1 to 5 and Comparative Example 11 that in order to obtain high activity, it is necessary to control not only the composition but also the binding state of the elements. This is also clarified from a comparison between Examples 6 to 10 and Comparative Example 12.

When the methanol oxidation catalyst obtained in Examples was applied to a reformed gas polymer electrolyte fuel cell, the same tendency was confirmed also in this case. Therefore, the methanol oxidation catalyst according to the embodiment is found to be more effective than the current Pt—Ru catalyst as to CO poisoning.

As described above, the catalyst according to the embodiment is highly active and stable, and therefore, this catalyst may be used to produce a high power fuel cell.

The present invention is not limited to the aforementioned embodiments and the structural elements may be modified and embodied within the spirit of the invention in its practical stage. Appropriate combinations of plural structural elements disclosed in the above embodiments enable the production of various inventions. For example, several structural elements may be deleted from all the structural elements shown in the embodiments. Also, the structural elements common to different embodiments may be appropriately combined.

The embodiment of the present invention provides a highly active methanol oxidation catalyst and a method for producing the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A methanol oxidation catalyst comprising:
nanoparticles having a composition represented by the following formula 1:

$$Pt_xRu_yMo_zT_u \quad \text{formula 1}$$

where T is at least one selected from the group consisting of W and V, x is 20 to 80 at. %, y is 10 to 60 at. %, z is 1 to 30 at. % and u is 1 to 30 at. %,
wherein the catalyst shows a peak derived from an oxygen bond of T and a peak derived from a metal bond of T in a spectrum measured by an X-ray photoelectron spectral method, and wherein the area of the peak derived from the oxygen bond of T is 80% or less of the area of the peak derived from the metal bond of T.

2. The methanol oxidation catalyst according to claim 1, wherein T is W.

3. The methanol oxidation catalyst according to claim 2, wherein z is 2 to 20 at. %.

4. The methanol oxidation catalyst according to claim 2, wherein u is 2 to 20 at. %.

5. The methanol oxidation catalyst according to claim 1, wherein a part of the Pt and Ru is substituted with a noble metal other than Pt and Ru.

6. The methanol oxidation catalyst according to claim 5, wherein the noble metal other than Pt and Ru is at least one selected from a group consisting of Rh, Os, Ir, Pd, Ag and Au.

7. The methanol oxidation catalyst according to claim 1, further comprising 25 at. % or less of oxygen.

8. The methanol oxidation catalyst according to claim 1, wherein a content of at least one impurity element selected from the group consisting of P, S and Cl is 0.1 at. % or less.

9. The methanol oxidation catalyst according to claim 1, wherein the nanoparticles have an average particle diameter of 10 nm or less.

10. The methanol oxidation catalyst according to claim 9, wherein the nanoparticles have an average particle diameter of 0.5 nm or more.

11. The methanol oxidation catalyst according to claim 1, further comprising a conductive support carrying the nanoparticles.

12. The methanol oxidation catalyst according to claim 11, wherein the conductive support is selected from a group consisting of a carbon material and a conductive ceramics material.

13. The methanol oxidation catalyst according to claim 12, wherein the wherein the conductive support is a carbon material that is in the form of a fiber, a tube, or a coil.

14. A methanol oxidation catalyst comprising:
nanoparticles having a composition represented by the following formula 1:

$$Pt_xRu_yMo_zT_u \quad \text{formula 1}$$

where T is at least one selected from the group consisting of W, Ni, Sn, Hf and V, x is 20 to 80 at. %, y is 10 to 60 at. %, z is 1 to 30 at. % and u is 1 to 30 at. %, wherein the catalyst shows a peak derived from an oxygen bond of T and a peak derived from a metal bond of T in a spectrum measured by an X-ray photoelectron spectral method, and wherein the area of the peak derived from the oxygen bond of T is 80% or less of the area of the peak derived from the metal bond of T.

15. A methanol oxidation catalyst comprising:

nanoparticles having a composition represented by the following formula 1:

  formula 1 where T is at least one selected from the group consisting of W and V, x is 20 to 80 at. %, y is 10 to 60 at. %, z is 1 to 30 at. % and u is 1 to 30 at. %, a part of the Pt and Ru is substituted with at least one selected from the group consisting of Rh, Os, Ir, Pd, Ag and Au, wherein the area of the peak derived from an oxygen bond of T is 80% or less of the area of the peak derived from a metal bond of T in a spectrum measured by an X-ray photoelectron spectral method.

16. A method for manufacturing the methanol oxidation catalyst according to claim 11, the method comprising:

keeping a conductive support at 400° C. or less; and depositing structural metal elements to the conductive support by a sputtering method or vapor deposition method to form the nanoparticles.

17. The method according to claim 16, further comprising washing the nanoparticles with an acid.

18. The method according to claim 16, further comprising washing the nanoparticles with an alkali solution.

19. The method according to claim 16, further comprising subjecting the nanoparticles to a heat treatment.

20. The method according to claim 19, wherein the heat treatment is carried out in a following condition: temperature of 10° C. or more and 400° C. or less and oxygen partial pressure of less than 5%.

21. The method according to claim 16, wherein the sputtering method or vapor deposition method allows other materials to deposit on the conductive support.

22. The method according to claim 16, wherein a dissolvable metal is deposited together with the structural metal elements on the conductive support by the sputtering method or vapor deposition method, the method further comprising washing with an acid to remove the dissolvable metal.

* * * * *